United States Patent [19]

Nakatsuka et al.

[11] 4,076,846

[45] Feb. 28, 1978

[54] PROTEIN-STARCH BINARY MOLDING COMPOSITION AND SHAPED ARTICLES OBTAINED THEREFOR

[75] Inventors: Ryuzo Nakatsuka; Setsuo Suzuki; Shinichi Tanimoto; Eiji Funatsu, all of Yokohama, Japan

[73] Assignee: Sumitomo Bakelite Company Limited, Tokyo, Japan

[21] Appl. No.: 631,405

[22] Filed: Nov. 12, 1975

[30] Foreign Application Priority Data

| Nov. 22, 1974 | Japan | 49-133580 |
| Nov. 22, 1974 | Japan | 49-133581 |
| Nov. 22, 1974 | Japan | 49-133582 |
| Nov. 22, 1974 | Japan | 49-133584 |
| Dec. 23, 1974 | Japan | 49-146797 |
| Dec. 28, 1974 | Japan | 49-149221 |

[51] Int. Cl.$^2$ .............................................. A23L 1/00
[52] U.S. Cl. ...................... 426/62; 426/248; 426/138; 426/656; 426/105; 426/512; 426/514; 426/516; 426/89
[58] Field of Search ............... 264/148, 176 R, 190, 264/202, 328; 426/105, 138, 512, 514, 516, 241, 62, 248, 656, 89

[56] References Cited

U.S. PATENT DOCUMENTS

| 3,493,382 | 2/1970 | Ryan et al. | 426/512 |
| 3,615,715 | 10/1971 | Mullen | 426/138 |
| 3,819,610 | 6/1974 | Akin | 264/202 |

*Primary Examiner*—Joseph M. Golian
*Attorney, Agent, or Firm*—Karl W. Flocks

[57] ABSTRACT

An edible, water-soluble, thermoplastic molding composition comprising a starch material, a neutral inorganic alkali salt of protein material, water, an edible plasticizer, an edible lubricant, and other additives. This composition shows excellent moldability and processability when subjected to various constomery dry processes for molding and processing customary plastics, such as compression molding, transfer molding, extrusion molding, blow molding, inflation molding, injection molding, vacuum forming, pressure forming, heat sealing, etc. Transparent or translucent shaped articles obtained from the above composition have unique properties such as gas impermeability, solubility in water, edibility, biodegradability, etc., and may be utilized with favorable results in various fields such as food industry, feedstuff industry, agriculture, fisheries, etc. The shaped articles, if necessary, can be allowed to have any balance between its water resistance and its water-solubility by ultraviolet irradiation or by the incorporation of a protein-coagulating agent.

23 Claims, No Drawings

PROTEIN-STARCH BINARY MOLDING COMPOSITION AND SHAPED ARTICLES OBTAINED THEREFOR

This invention relates to a protein-starch binary molding composition. More particularly, it relates to a protein-starch binary molding composition, a method for manufacturing the same, and shaped articles obtained therefrom, to which composition can be applied various customary dry processes for molding customary plastics, such as compression molding, transfer molding, extrusion molding, blow molding, inflation molding, injection molding, vacuum forming, pressure forming, etc.

An object of this invention is to provide a so-called water-soluble, edible, thermoplastic molding composition comprising an alkali metal or alkaline earth metal salt of a protein material, a starch material, water, an organic low-molecular-weight plasticizer, and a lubricant, all of these components being edible.

Another object of this invention is to provide a method for preparing the molding composition.

A further object of this invention is to provide a shaped article obtained from the said composition and a method for manufacturing the shaped article.

Supported by the renewed interest aroused in the food packaging field, demand for the edible sheet, tube, and film materials have been increased. To meet such a demand, collagen products have attracted broad interests. These products, however, are expensive and their uses are limited. Although an inexpensive film material made from starch (a wafer sheet) has been commercially available, it has been employed in only limited uses because of its low strength.

Quite recently, on the other hand, along with the ever increased public hazards brought about by waste plastic articles, development of a plastic material subject to the natural degradation cycle has been longed for. Under the circumstances and from the hygienic standpoint, the advent of edible plastics are required.

An example of proteinic substance which was used as a plastic material is the casein-based material utilized in the form of a film, a molded article, a fiber, an adhesive, and a surface coating. Actual application fields of these products, however, were limited owing to such disadvantages that shaping must be carried out by a wet process; the shaped articles must be immersed in formalin for a long period of time; and the physical properties of the articles are unsatisfactory.

Taking a film as an example, a film made from sodium caseinate incorporated with water and glycerol has hardly been put into practice, because it has disadvantages of low blocking resistance, tending to stick when wet, being very low in water resistance, and tending to dissolve in water, although the film has a number of advantageous characteristics such as high moisture retentivity, which keeps the film from becoming brittle on drying; good heat-sealability; transparency; and resistance to wet bleeding of a plasticizer. It is to be noted that as a result of experiments, the present inventors found that various dry molding techniques such as extrusion, injection, etc., can be easily applied to the shaping of said casein composition (see Table 1).

Starch sheet or starch film has heretofore been made generally by the so-called film casting method in which water is evaporated from an aqueous starch solution to obtain a film or sheet. Although the sheet or film formed by this method has characteristic features, the wet casting method has its own fatal disadvantages, as listed below, which hindered the starch sheet or film from such a rapid growth as has been shown by other plastics:

(1) A large quantity of heat is needed to obtain the end product by removal of water from an aqueous starch solution by evaporation. For starch, there are no other suitable solvents than water.
(2) Uses of the end product are limited, because, as is well known, it is difficult to obtain a starch sheet or film having a large thickness by the film casting method.
(3) Molded articles of complicated design cannot be obtained.
(4) Special complicated technique and equipment are needed even in making a sheet or film.
(5) The sheet and film obtained are affected very easily by the atmospheric humidity, becoming brittle in the dry air and bleeding the incorporated plasticizer in the humid air.

In order to overcome such difficulties, these has been proposed a customary extrusion method by use of a customary extruder as one of the dry processes, which method comprises chemically modifying the starch to impart processability thereto, adding to the modified starch various plasticizers and lubricants, and shaping the resulting composition. This method has an important significance in its simplicity as compared with the film casting method.

The chemical modification of starch, however, has a defect of spoiling the edibility which is one of the prime properties of starch. There is an attempt to improve the physical properties of shaped starch products by using a starch material containing a large amount, e.g. 50% or more, of so-called amylose having a linear configuration, such as high-amylose cornstarch, fractionated amylose, or the like. A starch containing higher percentages of amylose, however, becomes more difficult to dissolve in water and more crystalline, resulting in a decrease in processability. Thus, the attempt to improve the processability of starch materials by a chemical modification is accompanied by sacrifice of mechanical properties, moisture resistance, and water resistance which are associated with high crystallinity based on strong hydrogen bonding of starch, and is accompanied by sacrifice of edibility characteristic of starch which is obtained in unmodified type starch but not in any other.

There is another proposal to improve the above-said method by mixing untreated type and amylose with water and a low-molecular-weight organic plasticizer having a vapor pressure of 100 mmHg or less at 100° C., such as glycerol, ethylene glycol, propylene glycol, dimethylformaldehyde, or the like, subjecting the mixture to a high shearing stress, and extruding the resulting homogeneous fluid maintained at a high temperature through a die. The addition of a low-molecular-weight plasticizer alone has the following fatal disadvantages: (1) Because of its limited compatibility with starch, if a low-molecular-weight plasticizer is added in an amount exceeding 40 parts by weight per 100 parts by weight of starch, there is obtained on extrusion at elevated temperatures a soft, fragile, and non-sticky extrudate which cannot withstand the tension exerted by a takeoff winder, rendering the film formation under tension quite difficult. (2) Being hard and brittle on drying, as is well known, starch products require a large amount of plasticizer, the excess of which tends to cause so-called bleeding phenomenon, particularly under an atmosphere of high humidity, thus spoiling the product. (3) From the standpoint of edibility, there are only the limited number of suitable low-molecular-weight plasticizers compatible with starch, including water, glycerol, sorbitol, manitol and maltitol in all, which, however, have a reduced plasticizing action at low humidities and a tendency to bleed at high humidities. (4) Addition of a combination of water and a water-soluble polymer such as polyvinyl alcohol, in accordance with a proposal, does not sufficiently improve either the bleeding phenomenon or deficient extensibility, elongation, and strength at elevated temperatures; such a combination, in addition, is out of the question from the standpoint of environment preservation and edibility.

Taking the aforesaid disadvantages into consideration, the present inventors conducted extensive researches and as a result found out a surprising blend effect in a binary blend comprising an alkali metal or alkaline earth metal salt of proteinic substances and a starch-based product, as shown in Table 1. Such a surprising effect is most pronounced in a binary blend comprising a salt of unmodified protein and starch.

Table 1

| Characteristics | Type of film and method of manufacture | Film from milled blend of starch and low-mol.-wt. plasticizer (extrusion) | Film from milled blend of sodium caseinate and low-mol.-wt. plasticizer (extrusion) | Film from the present binary composition (extrusion) |
|---|---|---|---|---|
| 1. | Extensibility of extrudate | X | ◉ | ◉ |
| 2. | Blocking resistance (wet) | ◉ | X | ◉ |
| 3. | Bleeding resistance | X | ◉ | ◉ |
| 4. | Edibility | ◉ | ◉ | ◉ |
| 5. | Strength at low humidity | X | ◉ | ◉ |
| 6. | Heat-sealability | X | ◉ | ◉ |
| 7. | Water resistance | O | X | O |
| 8. | Transparency | X | O | O |
| 9. | Mechanical properties, particularly folding endurance | X | ◉ | O |

Note: ◉ excellent; O good; X poor

Further, by use of the above-noted binary blend, it has become possible to obtain a novel molding composition which is able to eliminate most of the disadvantages of such conventional molded articles as protein-based and starch-based sheet and film.

The present inventors had carried out extensive studies for the purpose of using proteins and starches as useful raw materials for plastics and as a result found that protein materials, especially their alkali metal or alkaline earth metal salts, are satisfactorily compatible with starch materials and, in addition, can be advantageously incorporated with plasticizers and lubricants. This finding led to a further finding that by properly mixing a salt of protein material, a starch material, water, a plasticizer, and a lubricant, it is possible to obtain a novel molding composition having excellent moldability and capable of yielding a molded article with favorable physical properties. Thus, it has become possible to obtain an edible molding composition having a high practicability by selecting edible components including a protein material, a starch material, water, a low-molecular-weight organic plasticizer, and a lubricant.

According to this invention, there is provided a water-soluble and edible thermoplastic molding composition comprising a starch material, an inorganic alkali salt of a protein material, an edible low-molecular-weight organic plasticizer, and an edible lubricant.

In the above-noted molding composition, it is preferable that the water content be adjusted to the range from 10 to 40% by weight and the weight ratio of starch material to protein material be from 10 : 90 to 90 : 10.

The present molding composition can be easily shaped by compression molding, transfer molding, injection molding, extrusion molding, blow molding, inflation molding, vacuum forming, or pressure forming and yields transparent or translucent molded articles, such as sheet, film, tubing, and bottle and other containers, which have excellent physical properties. The water content of the molded article is preferably adjusted to 5 to 30% by weight.

The "inorganic alkali salt" of protein materials as herein referred to means a salt of protein material with an alkali metal or an alkaline earth metal. The protein materials suitable for use in forming such a salt are those derived from various animals, plants, and microorganisms by concentration or extraction, such as casein (derived from milk, soybean, etc.), albumin (derived from blood or egg), collagen, gelatin, glue, gluten, etc. These are used each alone or in mixtures.

The inorganic alkali salt of protein material is prepared by neutralizing in an aqueous medium the protein material with an inorganic alkaline substance such as hydroxide, carbonate, or hydrogen carbonate of an alkali metal or an alkaline earth metal or a mixture of these alkaline substances to form a salt, separating the resulting salt, and drying.

Although any combination of a protein material and an alkali metal or an alkaline earth metal can be used for the purpose of this invention, sodium salt of casein, i.e. sodium casteinate is preferred, because it is light in color and excellent in dispersibility in water, film-forming property, and edibility. It is desirable for the improvement of water resistance to substitute a part or whole of the protein salt in the composition with an alkaline earth metal salt of protein, such as calcium salt.

In preparing the present composition, although it is desirable to use a previously prepared salt of the protein material, it is also possible to incorporate in the composition separately the protein material and a hydroxide, carbonate, or hydrogen carbonate of an alkali metal or an alkaline earth metal or an aqueous solution of the alkaline substance. In this case, the amount of the alkaline substance is preferably equivalent to the amount of free carboxyl groups of the protein material used so that free alkali may not present in the composition.

It is not recommendable to use a protein material itself in place of its alkali metal salt or alkaline earth metal salt in the present composition, because the composition yields a molded article inferior in flexibility, water retentivity, and mechanical strength, though fairly acceptable in other respects. A mixture of protein material and its salt may be used. A part of the protein material can be replaced by a protein material having its functional groups modified in a customary manner to such a degree that edibility is not injured.

The protein materials for use in the present composition can be partly replaced by a proteinrich grain powder, such as defatted soybean powder or by dried powders of an edible microorganism.

The suitable edible microorganisms include petroleum yeast (single cell yeast) produced by using petroleum hydrocarbon gas, n-paraffins, methanol, or ethanol as carbon source; torula yeast cultured on waste sulfite liquor; surplus beer yeast obtained as by-product in brewing; waste molasses yeast grown on waste molasses; baker's yeast; and edible microorganisms cultured on food by-products. Dried powders of these microorganisms containing 30% or more, preferably 50% or more (on dry basis), of proteins are used in the present composition. Of these, beer yeast and baker's yeast are particularly preferred. The dried residues obtained from waste molasses yeast cells after extraction of nucleic acid and other valuable constituents can be used. These dried edible microorganisms are highly hygroscopic and usually contain about 10% by weight of water. Such hygroscopic water is taken into account in preparing the present composition and, accordingly, in some cases a composition prepared without additional water is satisfactorily suited for the purpose of this invention.

The starch materials generally used in the present composition include various common type starches obtained from grain, potatoes, edible roots, etc., such as cornstarch, wheat starch, potato starch, tapioca starch, and the like, which generally contain 50% by weight or less of amylose. Preferred for further improvement in physical properties of molded articles, are special type starches containing more than 50% by weight of amylose, such as high-amylose starches and those mixtures of amylopectin and fractionated amylose which contain more than 50% by weight of amylose. Special type starches containing 10% or less of amylose, such as waxy cornstarch and glutinous rice starch, can be used in combination with high-amylose starches. Further, so-called unmodified treated starches such as α-starch and dextrin may also be used.

High-amylose starches contain more than 50% by weight of amylose and are generally special cornstarch derived from an improved corn variety. The high-amylose starch can be replaced by a socalled fractionated amylose containing 90% by weight or more of amylose, which is obtained from common type starches, such as potato starch, by fractionation, or replaced by a mixture of said fractionated amylose and other common type starches. The highamylose starch generally has a disadvantage of difficult gelatinization owing to its higher gelatinization temperature compared with common starches (15 - 30% amylose content). A quenched film having amorphous structure, which is made from an sufficiently gelatinized high-amylose starch, is excellent in flexibility and toughness. Characteristic features of the high-amylose starch are fully improved only in those shaped articles which have substantially amorphous structure. If a film is formed from an insufficiently gelatinized high-amylose starch, the resulting film still contains a large number of crystalline microparticles and is brittle and unsatisfactory in other physical properties, even inferior as compared with a film made from common starches.

It is conceivable from the foregoing that proper modifications of high-amylose starch might bring about a similar effect to that of conversion into α-type. However, in view of edibility, the type and degree of modification to be used is considerably limited. Consequently, in the case of a molding composition for use in the production of edible molded articles, as is the case with the present composition, it is undesirable to depend upon the modification of starch material, because allowable degree of modification would be small.

In accordance with this invention, in order to enhance the performance characteristics of high-amylose starch, gelatinization is effected by application of heat and pressure in the presence of water during the course of manufacturing the molding compositions as well as the molded articles. It is desirable to use a starch which had been previously transformed into α-type. The α-type high-amylose starch is obtained by treating a high-amylose starch in neutral or slightly alkaline water under application of heat and pressure to effect gelatinization and drying rapidly by dehydration. The α-starch material has improved compatibility with a neutral inorganic alkali salt of protein materials and improves moldability and processability of the molding composition. The molded articles obtained from such a molding composition are improved in transparency, flexibility, and water-solubility. Although such favorable effects of transformation into α-type are definitely observed with common starches, the effects are more pronounced with high-amylose starches.

The mixture of a starch material and a neutral inorganic alkali salt of a protein material according to this invention is not a simple mixture in which both materials in amorphous form are uniformly dispersed, but it seems that some degree of union has been established between both materials by chemical reaction, thus contributing to the improvement in physical properties. The chemical reaction between both materials is not always necessary in the manufacturing step of the composition, whereas in the molding step of the composition, said reaction is desirable for the improvement of the molded articles in appearance, particularly transparency and in physical properties, particularly mechanical strengths.

The occurrence of chemical reaction between the starch material and the neutral inorganic alkali salt of protein material is demonstrated by the facts that when a mixture of both components is heated, with the lapse of time, the dissolution speed of the mixture in cold water decreases, pale yellow discoloration of the mixture appears, and a characteristic odor is emitted. The transformation of the starch material into α-type prior to mixing of the composition is advantageous, because it enhances both the compatibility with the neutral inorganic alkali salt of protein material and the reaction of them.

The edible modified starch materials which can be used in the present composition include carboxymethyl starch, hydroxyethyl starch, hydroxypropyl starch, methyl starch, ethyl starch, methylhydroxyethyl starch, ethylhydroxypropyl starch, starch phosphate, etc. By use of such edible modified starches, it is possible to improve moldability and processability of the composition and physical properties of the sheet and film. To be edible, it is desirable that the modified starch has a degree of modification as small as possible and is used in admixture with a major amount of unmodified starch, a desirable amount of the modified starch in molded article being 10% by weight or less.

Although the weight ratio between the starch material and the alkali salt of protein material can be varied in a broad range, a desirable ratio is 90 to 10 parts by weight of the starch material for 10 to 90 parts by weight of the inorganic alkali salt of protein material. If the amount of starch material is below 10 parts by weight, the water resistance and blocking resistance of the molded article are decreased, while if it exceeds 90 parts by weight, the water retentivity characteristic is lost. More desirable weight ratio of the alkali salt of protein material to the starch material is in the range from 30/70 to 70/30.

Another important point in the present molding composition is the addition of an edible hydrophilic plasticizer capable of plasticizing or swelling the binary blend of the alkali metal salt or alkaline earth metal salt of protein material and the starch material. Any edible hydrophilic plasticizer capable of plasticizing the said binary blend may be used, and the plasticizing effect varies more or less according to the type of neutral inorganic alkali salt of protein material, the type of starch material, and the type of combination of these components. A combination of water, an edible low-molecular-weight organic plasticizer, and, if necessary, an edible polymeric plasticizer is effective.

The edible low-molecular-weight organic plasticizers suitable for use are edible polyhydric alcohols such as glycerol, sorbitol, sorbitan, mannitol, maltitol, ethylene glycol, propylene glycol, diethylene glycol, dipropylene glycol, hydrogenated starch syrup, sucrose, and maltose.

The edible polymeric plasticizers used together with edible low-molecular-weight organic plasticizers are natural polymers and derivatives thereof such as sodium cellulose glycolate, cellose methyl ether, sodium alginate, mannan, pullulan, agar, pectin, and gum.

The edible lubricants for use in the present molding compositions or molded articles should have the following properties: sufficient compatibility with the inorganic alkali salt of protein material and the starch material; no harmful effect on human body or nutritious for human body; adequate miscibility with a binary blend of the neutral inorganic alkali salt of protein material and the starch material; lubricating effect on molding. Such lubricants include mono-, di-, and triesters of edible polyhydric alcohols such as glycerol, sorbitol, sorbitan, mannitol, maltitol, ethylene glycol, diethylene glycol, propylene glycol, dipropylene glycol, hydrogenated starch syrup, and sucrose with edible higher fatty acids having 10 or more carbon atoms such as stearic acid, oleic acid, linoleic acid, linolenic acid, palmitic acid, and lauric acid; phospholipids such as lecithin (soybean phospholipid); and phosphoric acid-derivatives of said esters. These lubricants may be used each alone or in combinations of two or more. Of these lubricants, lecithin is particularly suitable as a lubricant for use in the present composition, because it has desirable affinity toward both protein materials and starch materials and adequate hydrophilic-lipophilic balance the suitable amount to be added of lecithin is 1% by weight or less based on total weight of the composition. If necessary, 10% by weight or more of lecithin can be added. A composition containing about 10% by weight of lecithin has favorable release property and a film made from such a composition may be used in place of release paper for bread and pastry. The ranges of lubricant and plasticizer are from 1 to 11 parts and from 20 to 60 parts by weight, respectively, as is seen from the Examples (Examples 8 and 9 show 1 part of lubricant and Examples 20 and 21 show 11 parts of lubricant; Examples 24 and 25 show 20 parts of plasticizer and Example 1–5 show 60 parts of plasticizer).

If the molding composition contains no lubricant, steady and continuous production of uniform articles is difficult during molding processes. The necessity of addition of a lubricant was neglected heretofore, because conventional starch-based molding compositions for wet processes contain relatively large amounts of water and are extruded or injected in the form of low viscous solution, and lubricating effect of the compositions is hardly observable.

The present composition is manufactured by uniformly mixing the components. The mixing is carried out in various ways such as, for example, simple blending at room temperature by use of an agitated blender and milling while heating at 40° to 50° C. or at higher temperatures by use of a heated milling equipment such as Henschel mixer, roll mill, pressure kneader, or extruder. The milled mass is granulated or ground after cooling to obtain a granulated or powdered composition which is preferred to a simply blended molding composition, because the former composition is more uniformly feedable through a hopper to an extruder or injection machine, can be remilled under milder conditions in an extruder or injection machine, and can yield more uniform articles by extrusion, injection molding, etc.

The shaped articles obtained from the present molding composition are perfectly edible, because all of the ingredients used in the composition are selected among foods are those food additives conforming to the Law of Food Sanitation in Japan and no significant reaction to spoil edibility occurs during the course of manufacturing the molding composition or molded articles.

The powdered, granulated, or pelletized composition obtained by milling, cooling, and grinding or granulating should be adjusted to predetermined water content by drying or humidification prior to molding by extrusion, injection, or other shaping techniques. Such adjustment of water content can be carried out during milling of the ingredients to form the molding composition. This is one of the advantages of the milling method for manufacturing the mold composition. Controlled water content of the molding composition makes it possible to avoid formation of pinholes or trapped gas bubbles caused by vaporization of excessive water, as is often the case with extrusion molding. The present molding composition is characterized by reduced water content, as compared with conventional compositions, so that it is processable by dry molding processes.

The present molding composition is stored preferably in cool and dark place to keep it from growth of fungi and bacteria. If necessary, a fungicide or bactericide can be added or the composition can be disinfected by exposure to microwaves or ultraviolet rays. In these respects, reduced water content is advantageous. Also the articles fabricated from the molding composition is desirably stored in a container tightly closed and refrigerated.

The molding composition thus prepared is thermoplastic molding material, in which all of the ingredients have been uniformly dispersed, and processable in the same manner as with conventional thermoplastic molding materials by compression molding, transfer molding, extrusion molding, injection molding, blow molding, and inflation molding, yielding water-soluble or water-degradable and edible non-pollution articles with economical advantage. The molded article offers excellent barrier against transmission of oxygen gas and advantageously utilized in food packaging either by itself or as a laminate with other plastic materials.

The molded articles obtained by extrusion or injection molding are substantially transparent or translucent, since the inorganic alkali salt of protein material and the starch material are uniformly dispersed and distributed. The edible articles obtained from the present composition have a good advantage over conventional ones in the balance between the performance characteristics and the production cost.

A molded article of predetermined shape is obtained by feeding the present molding composition through a hopper to an extruder or injection machine maintained at 100° C. or higher temperatures, milling the composition therein with heating, and injecting the milled and melt composition into a mold maintained 90° C. or lower temperatures or extruding through a die maintained at 100° C. or lower temperatures. Since the binary blend of the inorganic alkali salt of protein material and the starch material used in the present composition exhibits a favorable melt fluidity and extensibility inspite of reduced water content, the present composition is advantageously extruded through the die or injected into the mold cavity. The extruded film may be further subjected to calendering treatment to increase the commercial value of the product.

The present composition is extruded under the following conditions:

Extruder: L/D = 20 – 30 (Preferably vented type)
Screw: Compression ratio = 1.5 – 4.5 (Preferably Dulmadge type)
Barrel: Water-cooled at feed point. Barrel temperature, 90° – 200° C., preferably 100° – 170° C. Internal pressure, 10 – 150 kg/cm$^2$
Die: 70° – 120° C., preferably 70° – 100° C.

The atmosphere in the working room should be controlled to maintain a relative humidity of 20 to 80%, extremely dry atmosphere being undesirable.

The present composition is injected under the following conditions: temperature in the barrel should be in the range from 100° to 200° C., because below 100° C. the molding compositions have no sufficient melt fluidity for molding, whereas above 200° C. they discolour markedly due to decomposition of amylose; injection pressure should be 10 kg/cm$^2$ or higher, because below this limit gas bubbles are formed within the molded article, leading to defective products; mold temperature should be 90° C. or lower, because above 90° C. the molded article becomes so soft that the molded article is not regularly discharged by the knockout pin and continuous molding operation becomes difficult. When the compositions are injected under proper conditions outlines above, there is produced with a high efficiency transparent or translucent molded articles which have favorable moisture resistance. Thus, according to this invention, there is provided a commercially practicable novel technique for the continuous production of molded articles or predetermined shape from a binary blend of the inorganic alkali salt of protein material and the starch material.

Other molding processes are also applicable to the present composition under the conditions more or less similar to those described above.

The water-soluble and edible shaped articles, particularly the extruded film, according to this invention are useful in the field of food packaging. However, in some cases where the film is used in the packaging of high-water-content foods, the film may be unsatisfactory in water resistance. One of the means to improve water resistance is the ultraviolet irradiation treatment. As mentioned afore, important features of the present invention are the satisfactory compatibility of the neutral inorganic alkali salt of protein material with the starch material to form a homogeneous mixture and the loose crosslinking between both components induced by chemical reaction. Such crosslinking is accelerated mildly by heating or strongly by ultraviolet irradiation. When a shaped article obtained in a normal way is exposed to the ultraviolet radiation for an adequate period of time depending on the thickness of the article, the water resistance is improved to a predetermined extent and even an article insoluble in cold water and soluble in moderately hot water can be obtained.

Another means to improve water resistance is the addition of an edible protein-coagulating agent as a component of the molding composition. A suitable coagulant is selected from the group consisting of edible inorganic salts such as chlorides, carbonates, and phosphates of sodium, potassium, and calcium; edible low-molecular-weight organic acids such as lactic acid, malic acid, citric acid, tartaric acid, acetic acid, butyric acid, maleic acid, fumaric acid, and succinic acid; and neutral and acidic salts of said organic acids with sodium, potassium, or calcium. These coagulants are used each alone or in combination.

The protein-coagulating agent is added in a suitable amount to the present composition of normal formulation comprising a starch material, a neutral inorganic alkali salt of protein material, water, an edible plasticizer, and an edible lubricant. The resulting mixture is milled in the same way as mentioned before to form a water-soluble and edible thermoplastic molding composition containing a protein-coagulant. This composition is molded in the same manner as mentioned before to yield a water-soluble and edible thermoplastic molded article containing a protein-coagulant. The molded article thus obtained has a cold-water-solubility reduced to varied degrees depending on the added amount of coagulant and substantially the same warm-water-solubility as that of an article containing no coagulant. Thus, according to this invention, the balance between the water resistance and the water-solubility of the molded article can be regulated by varying the solubility in cold water in a broad range by controlling the ultraviolet irradiation dose or amount of coagulant.

The water-soluble and edible thermoplastic shaped article according to this invention is more difficult to dissolve in an aqueous solution containing a soluble inorganic salt such as common salt than in ordinary water and sparingly soluble in acidic water while easily soluble in alkaline water. Accordingly, an enteric capsule may be prepared by use of the present molded article. This is one of the important features of this invention.

A perfectly digestible molded article and a quite edible molded article may easily be obtained according to this invention. This is another feature of this invention.

The water-soluble and edible shaped article comprising starch-protein binary blend can be used in food, animal feed, and drug industries for subdivided packaging and its main uses are in water-soluble and edible packaging of precooked foods, pretreated feedstuffs, baits, and edible additives. It is suitable for use in making subdivided packages for one or several persons of dry granulates or powders such as seasonings (for example, dehydrated soup stock, dehydrated broth stock, dehydrated "miso" soup stock, common salt, sugar, sodium salts of amino acids, sodium inosinate); dehydrated cereal grains, vegetables, fruits, meats, eggs, etc.; flavorings and condiments; nutrients such as vitamins, minerals, essential amino acids, etc.; and drugs. Such subdivided packages are convenient for use, because they can be introduced in cold water or hot water without being unwrapped, a typical example being packages of seasoning for "instant" noodles. The present film or sheeting is also suitable for packing foods containing moderate amounts of water such as mayonnaise, jams, margarine, shortenings, "miso" (soybean paste), catchup, concentrated soup stock, broth stock, curried stew stock; pickles, vegetables, fruits, fishes, meats, bait paste, pet foods, etc. When these foods packed in the present film are introduced in cold or hot water, the film disintegrates easily. When used for packing those foods which contain common salt, vinegar, lactic acid, or alcohol, the present film or sheeting is improved in water resistance and also becomes bacteria-proof and fungi-proof.

In baking industry, the present film or sheeting may be used to pack the weighed quantities of baking additives such as yeast foods, margarine, shortenings, common salt, sugar, yeast, egg, cheese, flavoring, condiments, skimmed milk powder, etc. Such packages will eliminate the weighing error and contribute to sanitation and rationalization of the baking shop. Similar use of the film and sheeting will be found in confectionery. In using butter or margarine in the form of weighed sheet laminate (for example, so-called roll-in margarine), the partition film or paper may be replaced advantageously with the present water-soluble and edible film or sheeting. The present film of sheeting may be used as a release paper in baking and confectionery and does not need to be removed, because it is edible and can be integrated into the product.

The bait paste for fishing can be packed in the present film or sheeting to be stored for a long period of time or transported conveniently. When in use, the package is gradually disintegrated in water, thus providing an advantage of sustained action bait. The film or sheet, moreover, swells in water and the package is increased markedly in length, forming an ideal bait.

Since the present water-soluble and edible film or sheeting of starch-protein binary blend is excellent in low-temperature resistance and will not become brittle, it is far more suitable than other plastic films for packing frozen foods of high water content (for example, fishes, vegetables, fruits, and meats); it has also an advantage of non-sticking to ice.

Hot meat of foods such as chocolate, curry loux and the like, can be cast in a packaging case made from the present sheet material by thermoforming or from the present molding composition by injection molding to utilize the packaging case as a mold. The present shaped articles are also suitable as capsule shells for pharmaceutical preparations.

As disclosed above, edible sheet, film, and molded articles obtained from the water-soluble and edible molding composition according to this invention will find uses in various fields and the benefit given to industries would be tremendous.

The invention is illustrated below in detail with reference to Examples, but the invention is not limited to those Examples. In Examples all parts and percentages are by weight unless otherwise indicated.

EXAMPLE 1

|  | Parts |
|---|---|
| High-amylose cornstarch (60% amylose content) | 70 |
| Sodium caseinate (food additive grade) | 30 |
| Glycerol (food additive grade) | 60 |

Above mixture was milled in a two-roll mill at a surface temperature of 120° C., while successively adding suitable amounts of water on the one hand and simultaneously evaporating the water on the other hand, to form a uniform sheeting. The resulting sheeting was crushed by means of an impact crusher and admixed and 2 parts of lecithin (food additive grade) and left standing under a high humidity atmosphere at room temperature until the water content of the material reached 25% to obtain a granular, water-soluble, edible, thermoplastic molding composition. The granular molding composition thus obtained and favorable hopper-chargeability and showed also favorable moldability when tested by various molding methods such as extrusion, injection, inflation, and flow molding. The molding composition was stored in dark and cool place at a temperature below 10° C. It showed substantially no change after 6 months.

The said molding composition was continuously fed through a hopper into the barrel of an common extruder for common thermoplastic resin having a full flight screw (L/D = 20; compression ratio = 1.4) and milled under the following conditions: temperature inside the barrel = 120° - 160° C., revolution of screw = 30 - 100 rpm, pressure inside the barrel = 40 - 70 kg/cm$^2$. The milled mass was continuously extruded through a hanger-type die (surface temperature = 100° C., opening gap at the die lip = 0.1 mm) and drawn by means of a cold takeoff roll, while controlling the take-off speed so as to keep the film thickness within the range from 60 to 100 μ. The extrudate was dried to a water content of 15 to 20% and taken off by means of a winder. The thus obtained water-soluble and edible thermoplastic extruded film was translucent, pale yellow in color, flexible at 20% R.H., and resistant to bleeding and blocking at R.H. 80%. When stored in dark place in a tightly closed polyethylene bag at a temperature below 10° C. for 6 months, the film showed no change at all.

In a manner similar to that mentioned above, extruded sheeting of 1.0 mm thickness was obtained.

Inflation film, tubing, profiles, and blow-molded articles were satisfactorily produced from the molding composition obtained above.

Various articles were satisfactorily fabricated from the extruded materials by various techniques for thermoplastic resins, such as heat-sealing, vacuum forming, pressure forming, and thermal welding.

The fabricated articles were found useful for edible packaging of foods, feeds for animals and fishes, and bait (ground bait) for fishing.

Performance characteristics of the extruded film were as shown in Table 2.

Table 2

| Relative humidity, % | 20 | 45 | 65 | 80 |
|---|---|---|---|---|
| Moisture content, % | 5 | 10 | 15 | 35 |
| Dimensional change, % | 7 | 5 | 2 | 0 |
| Tensile strength, kg/mm$^2$ | 2.5 | 1.7 | 0.8 | 0.6 |
| Tensile modulus of elasticity, kg/mm$^2$ | 100 | 70 | 20 | 10 |
| Elongation, % | 10 | 20 | 35 | 50 |
| Tear strength, kg/mm$^2$ | | | 2.0 | |
| Folding endurance, number | 130 | 250 | 500 | 1,000 |
| Heat-sealability, second | | | | |
| 100° C. | 3 | 1.5 | 1.0 | 1.0 |
| 110° C. | 2.5 | 1.5 | 1.0 | 0.5 |
| 130° C. | 2 | 1.0 | 1.0 | 0.5 |

| Water-solubility, second | Stand still | Stirred |
|---|---|---|
| 10° C. | 75 – 160 | 60 – 125 |
| 20° C. | 30 – 50 | 20 – 33 |
| 30° C. | 7 – 15 | 5 – 10 |
| 40° C. | 3 – 12 | 2 – 8 |

Gas permeability,*
cc/m$^2$ · 24 hr. · atm. · 60 μ

| Oxygen | 130 |
|---|---|
| Nitrogen | 12 |
| Carbon dioxide | 200 |

Note:
Extruded film, 60 μ in thickness, was used in measurement of gas permeability.

The molding composition obtained above was automatically supplied to the barrel of an injection molding machine for common thermoplastic resin and plastified under the following conditions: temperature inside the barrel: 30° – 50° C. (water cooling) at the part below the hopper, 120° – 160° C. at middle part, 160° – 200° C. at front part. The molten mass was injected from the barrel under an injection pressure of 20 – 100 kg/cm$^2$ into the mold cavity at 60° – 90° C. to obtain a water-soluble, edible, thermoplastic injection-molded article. This molded article was translucent, pale yellow in color, not subject to static charge, oil resistant, heatsealable, and difficulty permeable to oxygen gas. The article was found useful as a container for edible oils and butter and as a capsule shell for pharmaceutical preparations.

A translucent hollow article could be produced by injection-blow technique.

EXAMPLES 2 TO 4

Table 3

| | Example 2 | Example 3 | Example 4 |
|---|---|---|---|
| High-amylose cornstarch, parts (Amylose content, 75%) | 50 | 50 | 50 |
| Sodium caseinate, parts | 40 | 40 | 40 |
| Glycerol, parts | 60 | 60 | 60 |
| Hydroxyethylated starch, parts | 10 | — | — |
| Carboxymethylated starch, parts | — | 10 | — |
| Starch phosphate, parts | — | — | 10 |
| Gum arabic, parts | — | — | 2 |

According to the formulations shown in Table 3, water-soluble and edible thermoplastic molding compositions were prepared in the same manner as in Example 1.

Molding compositions of Examples 2 to 4 has favorable moldability for various molding methods for thermoplastic resins, such as extrusion, injection, inflation, and blow molding, and yielded molded articles having excellent characteristics. Water contents of the composition obtained in Examples 2, 3, and 4 are 25, 28, and 30%, respectively.

The molding compositions obtained in Examples 2 to 4 were extrusion-molded under the same conditions as in Example 1. The molded articles obtained were nearly the same in appearance and physical properties. The extruded films, each 100 μ in thickness, obtained from the molding compositions of Examples 2, 3, and 4 showed tensile strengths of 1.3 to 1.6 kg/cm$^2$ and elongations of 18 to 23% at 20% R.H.

EXAMPLE 5

| | Parts |
|---|---|
| High-amylose cornstarch (amylose content, 20%; moisture content, 10%) | 40 |
| Sodium caseinate (food additive grade; moisture content, 10% | 40 |
| Glycerol (food additive grade) | 60 |
| Gelatin-sodium | 20 |
| Lecithin | 5 |

The above ingredients were mixed in a Henschel mixer (800 to 1,200 rpm) at 40° to 70° C., while adding water successively to adjust the moisture content to 20%, to obtain a water-soluble and edible thermoplastic molding composition in the form of fine granule. The resulting fine granular molding composition has good hopper-chargability and moldability in various molding processes. The gelatin-sodium in the above formulation can be replaced by a salt of a protein concentrate obtained by extraction from soybean casein, wheat gluten, corn zein, or yeast and neutralized with alkalis to a pH of 6 to 8 to form a salt.

The molding composition obtained above was continuously fed through a hopper into the barrel of a vented extruder containing a dulmadge-type screw (L/D = 30; compression ratio = 1.8) and plastified and melted under the following conditions: temperature inside the barrel : 30° – 50° C. (water cooling) at the part below the hopper, 100° – 140° C. at middle part, 70° – 110° C. at front part; revolution speed of the screw, 60 – 200 rpm; pressure inside the barrel, 60 – 120 kg/cm$^2$. The molten mass was continuously extruded through a die of the fishtail type (surface temperature, 70° – 90° C.; opening gap at the die lip, 0.05 mm) and drawn by means of a water-cooled roll, while controlling the take-off speed so as to keep the film thickness within the range from 40 to 60 μ. The extrudate was dried to a water content of 8 to 15% and taken off by means of a winder to obtain water-soluble and edible thermoplastic extruded film, 60 μ in thickness, which had a tensile strength of 1.5 kg/cm$^2$ and an elongation of 15% at 10% R.H.

By using the molding composition obtained above, a translucent container, 0.5 mm in wall thickness, was molded by the injection-blow molding technique under the conditions similar to those in Example 1. This container disintegrated rapidly in water, whereas it withstood a refrigeration temperature of −20° C. when used as a container for an edible oil or margarine.

EXAMPLE 6

| | Parts |
|---|---|
| High-amylose cornstarch | 40 |

-continued

| | Parts |
|---|---|
| (amylose content, 50%) | |
| Sodium caseinate | 30 |
| Glycerol | 50 |
| Dried yeast | 30 |
| Lecithin | 5 |

In the same manner as in Example 5, a mixture was compounded according to the formulation given above to obtain a water-soluble and edible thermoplastic molding composition of a water content of 40%. It had favorable moldability. The dried yeast in above formulation may be any of those which are edible and have a particle size smaller than 80-mesh, including baker's yeast, beer yeast, torula yeast, and so-called "petroleum yeast" (SCP) cultured on a medium such as ethanol, methanol, n-paraffin, or methane gas. The molded articles obtained from the molding composition containing these yeasts had nearly the same performance characteristics.

The molding composition obtained was extrusion-molded under the same conditions as in Example 5 to obtain low cost pale brown film containing water adjusted to 20 to 25%. Being water-soluble and biodegradable, this film is suitable for manufacturing "seed tape" and "seed map". A low cost water-soluble and edible injection molded article was also obtained by molding the said molding composition under similar conditions to those in Example 1.

EXAMPLES 7 to 9

Table 4

| | Example 7 | Example 8 | Example 9 |
|---|---|---|---|
| High-amylose cornstarch, parts (amylose content, 85%) | 30 | 30 | 30 |
| Casein-sodium, parts | 70 | 70 | 70 |
| Glycerol, parts | 30 | 30 | 30 |
| Lecithin, parts | 1 | 1 | 1 |
| Ethylene glycol, parts | 30 | — | — |
| Sorbitol, parts | — | 30 | — |
| Maltitol, parts | — | — | 30 |
| Sodium alginate, parts | — | 10 | — |
| Water, parts | 30 | 30 | 30 |

The ingredients given in Table 4 were mixed in a blender at room temperature to form fine granules of a water content of 25%. By means of a conventional extruder for thermoplastic resins, provided with a full flight screw (L/D = 22, compression ratio = 1.5), the said fine granules were extruded into a rod, 3 mm in diameter, under the following conditions: temperature inside the cylinder, 120° – 160° C.; revolution speed of screw = 100 rpm; temperature of die, 80° – 110° C. The rod was cut into pellets to obtain a water-soluble and edible thermoplastic molding composition having favorable moldability.

Each of the molding compositions thus obtained was extruded through a tubing die of the rotary type under nearly the same conditions as in Example 1 and expanded by compressed air to form inflation film, 40 – 80 μ in thickness, which contained 15% of water and had nearly the same appearance and physical properties as those of the film obtained in Example 1. The film obtained was excellent especially in heat-sealability and bags were automatically made from the said film by means of a common heat-sealer at 110° to 150° C. with a cycle time of 0.5 to several seconds.

A water-soluble and edible injection-molded article having excellent appearance and performance characteristics was also obtained under nearly the same conditions as in Example 1 from each of the molding compositions.

EXAMPLES 10 TO 13

Table 5

| | Ex. 10 | Ex. 11 | Ex. 12 | Ex. 13 |
|---|---|---|---|---|
| High-amylose cornstarch (amylose content, 50%), parts | 70 | 70 | 70 | 70 |
| Sodium caseinate, parts | 30 | 30 | 30 | 30 |
| Glycerol, parts | 30 | 30 | 30 | 30 |
| Lecithin, parts | 1 | 1 | 1 | 1 |
| Sucrose monostearate, parts | 1 | | | |
| Glycerol monolaurate, parts | | 1 | | |
| Sorbitol distearate, parts | | | 1 | |
| Maltitol monostearate, parts | | | | 1 |
| Mannan, parts | | | 5 | 2 |

By application of a technique similar to that in Example 5, water-soluble and edible thermoplastic compositions of an adjusted water content of 15% having favorable moldability were obtained from the ingredients given in Table 5.

Each molding composition was moldable by the methods employed in Example 1 and the resulting molded articles had performance characteristics nearly equal to those in Example 1. Especially, the extruded films and sheets containing 15% of water were characterized by the excellent blocking resistance at high relative humidities above 80%.

EXAMPLES 14 – 17

Table 6

| | Ex. 14 | Ex. 15 | Ex. 16 | Ex. 17 |
|---|---|---|---|---|
| High-amylose cornstarch (amylose content, 53%), parts | 40 | 40 | 40 | 40 |
| Casein-sodium, parts | 40 | 40 | 30 | 40 |
| Glycerol, parts | 40 | 40 | 40 | 40 |
| Lecithin, parts | 2 | 2 | 2 | 2 |
| Wheat starch (amylose content, 25%), parts | 20 | — | — | — |
| Converted α-starch, parts | — | 20 | 20 | — |
| Dextrin, parts | — | — | — | 20 |
| Beer yeast, parts | — | — | 10 | — |
| Sucrose monostearate, parts | — | — | 2 | — |
| Water, parts | 40 | 40 | 40 | 40 |

By application of a technique similar to that in Example 7, water-soluble and edible thermoplastic compositions of a water content of 25% having favorable moldability were obtained from the ingredients given in Table 6. Each composition was extruded under the conditions similar to those in Example 5 to obtain film and sheeting of a water content of 15 to 20% having performance characteristics comparable to those in Example 1. These extruded films were especially excellent in transparency, and the sheetings were suitable for thermoforming. Injection-molded articles excellent particularly in transparency were obtained by injection molding under the conditions similar to those in Example 1.

EXAMPLES 18 and 19

Table 7

| | Example 18 | Example 19 |
|---|---|---|
| High-amylose cornstarch (amylose content, 70%), parts | 55 | 55 |
| Low-amylose cornstarch (amylose content, 5%), parts | 10 | — |
| Dextrin, parts | — | 5 |
| Starch phosphate, parts | — | 5 |

Table 7-continued

|  | Example 18 | Example 19 |
|---|---|---|
| Casein-potassium, parts | — | 10 |
| Gelatin-sodium, parts | 25 | 25 |
| Yeast, sodium salt, parts | 10 | — |
| Glycerol, parts | 60 | 40 |
| Mannitol, parts | — | 20 |
| Sucrose monostearate, parts | — | 2 |
| Glycerol monostearate, parts | — | 2 |
| Lecithin, parts | 10 | — |
| Sodium cellulose glycolate, parts | 5 | 5 |

In the same manner as in Example 5, water-soluble and edible thermoplastic molding compositions of a water content of 35% were obtained from the ingredients given in Table 7. These compositions were moldable under the molding conditions used in Example 1 and gave various molded articles having the good appearance and performance characteristics comparable to those in Example 1, except that as compared with the composition of Example 1, the compositions of Examples 18 and 19 were slightly inferior in moldability so that continuous molding was prone to slight disturbance and particularly in high-speed extrusion, surging occurred sometimes and caused fluctuation in thickness of the extrudate.

EXAMPLES 20 to 23

Table 8

|  | Ex. 20 | Ex. 21 | Ex. 22 | Ex. 23 |
|---|---|---|---|---|
| α-Type high-amylose cornstarch (amylose content, 50%), parts | 50 | 30 | 30 | 30 |
| Casein-sodium, parts | 50 | 40 | 40 | 50 |
| Glycerol, parts | 30 | 30 | 30 | 30 |
| Lecithin, parts | 10 | 10 | 10 | 10 |
| Tapioca starch, parts |  |  |  | 20 |
| Waxy cornstarch (amylose content, 0%), parts |  |  | 20 |  |
| Fractionated potato starch (amylose content, 100%), parts |  | 20 |  |  |
| Gelatin-sodium, parts |  |  | 10 |  |
| Yeast, parts |  | 10 |  |  |
| Ethylene glycol, parts |  | 10 |  | 10 |
| Hydrogenated starch syrup, parts |  |  | 5 |  |
| Sucrose distearate, parts | 1 |  |  |  |
| Glycerol trilaurate, parts |  | 1 |  |  |
| Pectin, parts |  | 2 |  | 2 |

In the same manner as in Example 1, water-soluble and edible thermoplastic molding compositions of a water content of 25% having favorable moldability were obtained from the ingredients given in Table 8. These compositions were moldable under the molding conditions described in Examples 1 and 5, yielding various molded articles excellent particularly in transparency. Physical properties of the extruded film of an adjusted water content of 12%, 60 μ in thickness, were as shown in Table 9.

Table 9

| Performance characteristics of the extruded film obtained in Example 20 (60 μ in thickness; relative humidity, 45%). | |
|---|---|
| Moisture content, % | 12 |
| Tensile strength, kg/cm$^2$ | 1.8 |
| Tensile modulus of elasticity, kg/mm$^2$ | 25 |
| Elongation, % | 70 |
| Water-solubility at 10° C., second | Stand still: 15 – 20 Stirred: 12 – 17 |

The extruded films obtained in Examples 21 to 23 were also excellent in transparency, solubility in cold water, and flexibility.

EXAMPLES 24 and 25

Table 10

|  | Example 24 | Example 25 |
|---|---|---|
| α-Type potato starch (amylose content, 20%), parts | 18 | 18 |
| High-amylose cornstarch ethyl ether (amylose content, 60%), parts | 2 | — |
| High-amylose cornstarch phosphate (amylose content, 60%), parts | — | 2 |
| Gelatin-sodium, parts | 80 | 80 |
| Glycerol, parts | 20 | — |
| Propylene glycol, parts | — | 10 |
| Sorbitan, parts | — | 10 |
| Mannitol monolaurate, parts | 5 | 5 |
| Maltitol monostearate, parts | — | 5 |
| Pullulan, parts | 2 | — |

In the same manner as in Example 1, water-soluble and edible thermoplastic molding compositions of a water content of 40% having favorable moldability were obtained from the ingredients given in Table 10. These compositions were molded under the molding conditions described in Examples 1 and 5 and various articles having performance characteristics comparble to those of the articles obtained in Example 20 were produced.

EXAMPLES 26 to 28

Table 11

|  | Example 26 | Example 27 | Example 28 |
|---|---|---|---|
| Tapioca starch (amylose content, 30%), parts | 23 | 15 | 15 |
| α-Type tapioca starch, parts | — | 8 | — |
| Dextrin, parts | — | — | 4 |
| Carboxymethylstarch, parts | — | — | 4 |
| Casein-sodium, parts | 77 | 77 | 77 |
| Glycerol, parts | 50 | 30 | 50 |
| Mannitol, parts | — | 20 | — |
| Lecithin, parts | 5 | 5 | 5 |
| Water, parts | 30 | 30 | 30 |

In a manner similar to that in Example 7, water-soluble and edible thermoplastic molding compositions of a water content of 23% having favorable moldability were obtained from the ingredients given in Table 11. These molding compositions were molded under the conditions described in Example 1 and 5 to obtain various molded articles having the appearance and performance characteristics comparable to those of the articles obtained in Example 1.

EXAMPLE 29

Following the procedure of Example 1, a water-soluble and edible thermoplastic molding composition of a water content of 28% was obtained from a mixture of ingredients of the same formulation as in Example 2, except that 40 parts of powdered casein and 8 parts of a 20-% aqueous solution of sodium hydroxide were used in place of 40 parts of powdered casein-sodium. The thus obtained molding composition had characteristic properties comparable to those of the molding composition obtained in Example 2. When similar variation of formulation was applied to the formulations of Examples 3 and 4, the characteristic properties of the resulting molding compositions were not much different from those of the compositions of original formulations.

EXAMPLE 30

A water-soluble and edible thermoplastic molding composition of a water content of 17% was obtained in the same manner as in Example 5, except that 40 parts of casein, 20 parts of gelatin, 10 parts of a 20-% aqueous solution of sodium hydroxide, and 5 parts of a 20-% aqueous dispersion of calcium hydroxide were used in place of 40 parts of casein-sodium and 20 parts of gelatin-sodium. The thus obtained molding composition had characteristic properties comparable to those of the molding composition obtained in Example 5. When similar variation of formulation was applied to the formulations of Examples 19 and 22, the characteristic properties of the resulting molding compositions were not much different from those of the compositions of original formulations.

EXAMPLE 31

A water-soluble and edible thermoplastic molding composition (28% water content) was obtained in the same manner as in Example 7, except that 65 parts of casein and 27 parts of an aqueous solution containing 20% of a mixture (1 : 1 by weight) of potassium hydroxide and potassium carbonate were used in place of 70 parts of casein-sodium. The thus obtained molding composition showed characteristic properties comparable to those of the molding composition obtained in Example 7. When similar variation of formulation was applied to the formulations of Examples 8 and 9, the characteristic properties of the resulting molding compositions were not much different from those of the compositions of original formulations.

EXAMPLE 32

A water-soluble and edible thermoplastic molding composition (22% water content) was obtained in the same manner as in Example 20, except that 49 parts of casein and 15 parts of a 20-% aqueous solution of sodium carbonate were used in place of 50 parts of casein-sodium. The thus obtained molding composition had characteristic properties comparable to those of the molding composition obtained in Example 20. When similar variation of formulation was applied to the formulation of Example 23, the characteristic properties of the resulting molding composition were not much different from those of the composition of original formulation.

EXAMPLE 33

A water-soluble and edible thermoplastic molding composition (35% water content) was obtained in the same manner as in Example 24, except that 80 parts of gelatin and 10 parts of a 20-% aqueous solution of sodium hydroxide were used in place of 80 parts of gelatin-sodium. The thus obtained molding composition had characteristic properties comparable to those of the composition obtained in Example 24. When similar variation of formulation was applied to the formulation of Example 25, the characteristic properties of the resulting molding composition were not much different from those of the composition of original formulation.

EXAMPLE 34

A water-soluble and edible thermoplastic molding composition (23% water content) was obtained in the same manner as in Example 26, except that 75 parts of casein and 15 parts of a 20-% aqueous solution of sodium hydroxide were used in place of 77 parts of casein-sodium. The thus obtained molding composition had characteristic properties comparable to those of the composition obtained in Example 26.

EXAMPLE 35

The extruded film obtained in Example 1 was exposed to the ultraviolet radiation for 3 minutes at room temperature. On examination of the exposed film, slight yellowing in color, emission of a peculiar odor, and a marked reduction in water-solubility were noticed (see Table 12).

Table 12

| Temperature of water, °C. | Change in water-solubility | |
|---|---|---|
| | Before exposure | After exposure |
| 0 | 6 - 15 min. | Swells, but remains insoluble |
| 50 | 3 sec. > | 5 sec. > |

These phenomena were common, though the degree varied, to all extruded films of Examples 1 to 34. By using said phenomena to advantage, water resistance of the water-soluble extruded film could be improved to some degree. Since the ultraviolet irradiation resulted in no substantial change in fabricability such as heat-sealability and in other physical properties, the extruded film insolubilized by such a treatment was suitable for the packaging of water-containing foods such as margarin, "miso" (soybean paste), and the like.

EXAMPLE 36

A water-soluble and edible thermoplastic molding composition (20% water content) was obtained in the same manner as in Example 5, except that 10 parts of common salt was added to the formulation. The resulting composition showed no significant change in moldability and in appearance and physical properties of the molded articles, except that the water-solubility at lower temperatures was markedly reduced as shown in Table 13.

Table 13

| Temperature of water, °C. | Change in water-solubility | |
|---|---|---|
| | Example 5 | Example 36 |
| 0 | 350 - 750 sec. | Swelled but insoluble |
| 20 | 15 - 23 sec. | 45 - 80 sec. |
| 40 | 2 - 7 sec. | 3 - 10 sec. |

Such a tendency was found to be common to all of the formulations given in Examples 1 to 28. Substantially the same effect was observed when common salt was replaced by potassium chloride, potassium phosphate, potassium carbonate, sodium phosphate, sodium carbonate, calcium hydroxide, and calcium chloride.

EXAMPLE 37

A water-soluble and edible thermoplastic molding composition (22% water content) was obtained in the same manner as in Example 7, except that 5 parts of lactic acid was added to the formulation. The resulting composition showed no substantial change in moldability and in appearance and physical properties of the molded articles, except that the water-solubility at lower temperatures was markedly reduced as shown in Table 14.

Table 14

| Temperature of water, °C. | Change in water-solubility | |
|---|---|---|
| | Example 7 | Example 37 |
| 0 | 300 – 500 sec. | Swelled but insoluble |
| 20 | 30 – 45 sec. | 50 – 90 sec. |
| 40 | 3 – 8 sec. | 4 – 15 sec. |

Such was a general tendency common to all of the formulations given in Examples 1 to 34. Substantially the same effect was observed when lactic acid was replaced by malic acid, citric acid, tartaric acid, acetic acid, and butyric acid.

EXAMPLE 38

Following the procedure described in Example 7, a water-soluble and edible thermoplastic molding composition in granular form (20% water content) was obtained from a mixture of ingredients of the same formulation as in Example 20, except that 3 parts of sodium phosphate and 1 part of citric acid were further added to the formulation. The resulting composition showed no substantial change in moldability and in appearance and physical properties of the molded articles, except that in cold water below 10° C. the molded article remained insoluble, although swollen.

What is claimed is:

1. A water-soluble and edible thermoplastic molding composition comprising:
   a starch material; a protein material; water; an organic, low-molecular-weight plasticizer; and a lubricant;
   said starch material being at least one edible, natural, unmodified starch;
   said protein material being at least one edible protein salt selected from the group consisting of sodium, potassium and calcium salts of edible, natural protein concentrates;
   said organic low-molecular-weight plasticizer being at least one edible, polyhydric alcohol selected from the group consisting of glycerol, ethylene glycol, diethylene glycol, sorbitol, sorbitan, mannitol, maltitol, hydrogenated starch syrup, and sucrose; and
   said lubricant being at least one lubricant selected from the group consisting of mono-, di and tri-esters of said edible, polyhydric alcohols with edible higher fatty acids having at least 10 carbon atoms, phosphoric acid derivatives of said esters and lecithin;
   said starch containing at least 50% by weight of amylose; the weight ratio of said starch to said protein salt being 30/70 to 70/30; the water content of the composition being 10 to 40% by weight based on the total weight of the composition; and the amount of said organic, low-molecular-weight plasticizer and that of said lubricant being, respectively, 20 to 60 parts by weight and 1 to 11 parts by weight per 100 parts by weight, in total, of said starch and said protein salt.

2. A molding composition according to claim 1, wherein the starch is one which has been previously transformed into α-type.

3. A composition according to claim 1, wherein said composition further contains, as an edible filler, at least one edible microorganism selected from the group consisting of beer yeasts, baker's yeasts, torula yeast, waste molasses yeast, and single cell protein (SCP).

4. A molding composition according to claim 1, wherein said edible protein salt is sodium caseinate.

5. A molding composition according to claim 1, wherein said composition contains, in addition, at least one member selected from the group consisting of (A) neutral and acidic salts of sodium, potassium and calcium with hydrochloric and phosphoric acids, (B) edible low-molecular-weight organic acids consisting of lactic, malic, citric, tartaric, acetic, butyric, maleic, fumaric and succinic acids and (C) neutral and acidic salts of sodium, potassium and calcium with said organic acids.

6. A composition according to claim 1 wherein the edible protein salt is sodium caseinate, the plasticizer is glycerol, and the lubricant is lecithin.

7. A molding composition according to claim 1 wherein the starch material further contains up to 10% by weight of an edible modified starch base on the weight of the molded article, the edible modified starch being at least one edible modified starch selected from the group consisting of carboxymethyl starch, hydroxyethyl starch, hydroxypropyl starch, methyl starch, ethyl starch and starch phosphate.

8. A method for manufacturing a water-soluble and edible thermoplastic molding composition in the granular form, which comprises:
   heating and mixing at 50° C or more a blend of (A) at least one edible natural unmodified starch, (B) at least one edible natural protein concentrate, (C) an aqueous dispersion of at least one inorganic alkali selected from the group consisting of sodium, potassium and calcium hydroxides, carbonates and bicarbonates, to form a salt of the protein, (D) at least one edible organic low-molecular-weight plasticizer selected from the group consisting of glycerol, ethylene glycol, sorbitol, sorbitan, mannitol, maltitol, hydrogenated starch syrup, and sucrose, and (E) at least one lubricant selected from the group consisting of mono-, di- and tri-esters of the edible polyhydric alcohols set forth in (D) with edible higher fatty acids having at least 10 carbon atoms, phosphoric acid derivatives of said esters and lecithin;
   said starch material containing at least 50% by weight of amylose; the weight ratio of said starch material to said protein salt being 30/70 to 70/30; the amount of said organic low-molecular-weight plasticizer and that of said lubricant being, respectively, 20 to 60 parts by weight and 1 to 11 parts by weight per 100 parts by weight, in total, of said starch material and said protein salt; and the amount of said aqueous dispersion of at least one inorganic alkali being sufficient enough to substantially neutralize said protein;
   while gradually adding further water and
   thereafter granulating the blend and finally adjusting the water content in the composition to 10 to 40% by weight.

9. A method according to claim 8, wherein the edible natural protein concentrate is casein and the aqueous dispersion of inorganic alkali is an aqueous sodium hydroxide solution.

10. A method for manufacturing a water-soluble and edible thermoplastic extrusion-molded article, which comprises:

heating, mixing and granulating a blend of a starch
material, a protein material, water, an organic low-
molecular-weight plasticizer and a lubricant to
form a thermoplastic molding material;
introducing the molding material into the heated
barrel of an extruder;
mixing the composition under pressure in the ex-
truder, and
then extruding the mixed composition through a die;
and
finally adjusting the water content in the resulting
molded article to 5 to 30% by weight;
said protein material being at least one edible protein
salt selected from the group consisting of edible
neutral salts of sodium, potassium and calcium with
edible natural protein concentrates; said organic
low-molecular-weight plasticizer being at least one
edible polyhydride alcohol selected from the group
consisting of glycerol, ethylene glycol, diethylene
glycol, sorbitol, sorbitan, mannitol, maltitol, hy-
drogenated starch syrup and sucrose; said lubricant
being at least one member selected from the group
consisting of mono-, di- and tri-esters of said edible
polyhydric alcohols with edible higher fatty acids
having at least 10 carbon atoms, phosphoric acid
derivatives of said esters and lecithin; said starch
material being at least one edible natural unmodi-
fied starch, and containing at least 50% by weight
of amylose;
the weight ratio of said starch material to said protein
salt being 30/70 to 70/30; the water content in the
composition being 10 to 40% by weight; and the
amount of said organic low-molecular-weight
polasticizer and that of said lubricant being, respec-
tively, 20 to 60 parts by weight and 1 to 11 parts by
weight per 100 parts by weight, in total, of said
starch material and said protein salt;
said heating and mixing being effected at a tempera-
ture of 40° C to 160° C, said extruder having a L/D
of 20 to 30 and a screw compression ratio of 1.5 to
4.5, the extrusion conditions being such that the
barrel under the hopper is cooled with water, the
barrel temperature is 90-200° C, the die tempera-
ture is 70-120° C, and the barrel internal pressure is
10-150 kg/cm².

11. A method according to claim 10, wherein the
edible protein salt is a mixture of (A) at least one edible
natural protein concentrate and (B) an aqueous disper-
sion of at least one inorganic alkali selected from the
group consisting of sodium, potassium and calcium
hydroxides, carbonates and bicarbonates in an amount
sufficient to substantially neutralize the protein concen-
trate.

12. A method according to claim 11, wherein the
aqueous dispersion of an inorganic alkali is an aqueous
solution of sodium hydroxide, and the edible natural
protein concentrate is casein.

13. A method according to claim 10 wherein the
edible protein salt is sodium caseinate.

14. A method according to claim 10, wherein the
molding composition contains, in addition, an edible
dry yeast.

15. A method according to claim 10, wherein the
resulting water-soluble extrusion-molded article is fur-
ther subjected to ultraviolet radiation to make it soluble
in warm water but difficult to dissolve in cold water.

16. A method for manufacturing a water-soluble edi-
ble thermoplastic injection-molded article, which com-
prises:
heating, mixing and granulating a blend of a starch
material, a protein material, water, an organic low-
molecular-weight plasticizer, and lubricant to form
a thermoplastic molding composition in granular
form;
introducing the molding composition into the heated
barrel of an injection machine;
injecting the composition under pressure into a mold
maintained at a temperature slightly lower than
that of said barrel to fill the mold cavity; and
then adjusting the water content in the resulting
molded article to 5 to 30% by weight;
said starch material being at least one edible natural
unmodified starch; said protein material being at
least one edible protein salt selected from the group
consisting of edible neutral salts of sodium, potas-
sium, and calcium with edible natural protein con-
centrates; said organic low-molecular-weight plas-
ticizer being at last one edible polyhydric alcohol
selected from the group consisting of glycerol,
ethylene glycol, diethylene glycol, sorbitol, sorbi-
tan, mannitol, maltitol, hydrogenated starch syrup,
and sucrose; said lubricant being at least one mem-
ber selected from the group consisting of mono-,
di- and tri-esters of said edible polyhydric alcohols
with edible higher fatty acids having at least 10
carbon atoms, phosphoric acid derivatives of said
esters and lecithin;
said starch material in the molding composition con-
taining at least 50% by weight of amylose; the
weight ratio of said starch material to said protein
salt being 30/70 to 70/30; the water content in the
molding composition being 10 to 40% by weight;
the amount of said organic low-molecular-weight
plasticizer and that of said lubricant being, respec-
tively, 20 to 60 parts by weight and 1 to 11 parts by
weight per 100 parts by weight, in total, of said
starch material and said protein salt;
said heating and mixing being effected at 40°-160° C
the injection-molding conditions being such that
the barrel temperature is 100-200° C, the mold
temperature is up to 80° C, and the injection pres-
sure is 10 kg/cm² or more.

17. A method according to claim 16, wherein the
edible protein salt is sodium caseinate.

18. A method according to claim 16 wherein the
molding composition contains, in addition, an edible
dry yeast.

19. A method according to claim 16, wherein the
resulting water-soluble injection-molded article is fur-
ther subjected to ultraviolet radiation to make it soluble
in warm water but difficult to dissolve in cold water.

20. A water-soluble and edible thermoplastic film or
sheet which comprises a starch material, a protein mate-
rial, water, an organic low-molecular-weight plasticizer
and a lubricant, and has excellent physical properties
and post-processability, said starch material being at
least one edible natural unmodified starch, said protein
material being at least one edible protein salt selected
from the group consisting of edible neutral salts of so-
dium, potassium and calcium with edible natural protein
concentrates, said organic low-molecular-weight plasti-
cizer being at least one edible polyhydric alcohol se-
lected from the group consisting of glycerol, ethylene
glcyol, diethylene glycol, sorbitol, sorbitan, mannitol, maltitol, hydrogenated starch syrup, and sucrose, said lubricant being at least one member selected from the group consisting of mon-, di- and tri-esters of said edible polyhydric alcohols with edible higher fatty acids having at least 10 carbon atoms, phosphoric acid derivatives of said esters and lecithin, said starch material containing at least 50% by weight of amylose, the weight ratio of said starch material to said protein salt being 30/70 to 70/30, the water content in the film or sheet being 5 to 30% by weight, the amount of said organic low-molecular-weight plasticizer and that of said lubricant being, respectively, 20 to 60 parts by weight and 1 to 11 parts by weight per 100 parts by weight, in total, of said starch material and said protein salt.

21. An edible film or sheet soluble in warm water but difficult to dissolve in cold water, which comprises the starch material, protein material, water, organic low-molecular-weight plasticizer and lubricant as set forth in claim 20 and also contains, as an edible protein-coagulating agent, at least one member selected from the group consisting of (A) edible neutral and acidic salts of sodium, potassium and calcium with hydrochloric, carbonic and phosphoric acids, (B) edible organic low-molecular-weight acids which are lactic, malic, citric, tartaric, acetic, butyric, maleic, fumaric, and succinic acids, and (C) neutral and acidic salts of said organic acids with sodium, potassium and calcium.

22. A film or sheet according to claim 20, wherein it is made soluble in warm water but difficult to dissolve in cold water by subjecting it to ultraviolet radiation.

23. A water-soluble edible film or sheet which comprises at least one edible natural unmodified starch containing at least 50% by weight of amylose, sodium caseinate, water, glycerol and lecithin, the weight ratio of said starch to said sodium caseinate being 30/70 to 70/30, the water content in the film or sheet being 5 to 30% by weight, the amount of said glycerol and said lecithin being, respectively, 20 to 60 parts by weight and 1 to 11 parts by weight per 100 parts by weight, in total, of said starch and said sodium caseinate.

* * * * *